US00RE34732E

United States Patent [19]

Iri et al.

[11] E Patent Number: Re. 34,732

[45] Reissued Date of Patent: Sep. 20, 1994

[54] WATERPROOF OPTICAL FIBER CABLE

[75] Inventors: Eiji Iri; Takashi Kaneko; Takeshi Shintani; Kotaro Mio; Yasuo Ijiri, all of Hyogo, Japan

[73] Assignee: Mitsubishi Cable Industries, Ltd., Hyogo, Japan

[21] Appl. No.: 967,122

[22] Filed: Oct. 27, 1992

Related U.S. Patent Documents

Reissue of:

[64] Patent No.: 4,711,523
Issued: Dec. 8, 1987
Appl. No.: 39,806
Filed: Apr. 15, 1987

U.S. Applications:

[63] Continuation of Ser. No. 637,540, Aug. 3, 1984, abandoned.

[30] Foreign Application Priority Data

Aug. 11, 1983 [JP] Japan ..... 58-147792
Aug. 11, 1983 [JP] Japan ..... 58-147793

[51] Int. Cl.[5] ..... G02B 6/44

[52] U.S. Cl. ..... 385/109; 385/100; 385/113

[58] Field of Search ..... 385/109, 113, 100

[56] References Cited

U.S. PATENT DOCUMENTS 4,370,023 1/1983 Lange et al. ..... 350/96.23

FOREIGN PATENT DOCUMENTS 0032268 12/1980 European Pat. Off. .
0067009 5/1982 European Pat. Off. .
58-147792 8/1983 Japan .
58-147793 8/1983 Japan .

OTHER PUBLICATIONS

IEEE International Conference on Communications, Vo. 3, pp. 13–17, Jun. 1983, pp. 7D.4.1–7D.4.3, Philadelphia, US, IEEE, New York.

*Primary Examiner*—Rodney B. Bovernick
*Assistant Examiner*—Robert E. Wise
*Attorney, Agent, or Firm*—Wenderoth, Lind & Ponack

[57] ABSTRACT

An optical fiber cable comprising a water blocking layer, an optical fiber disposed inside the water blocking layer and a water blocking material filling the space between the water blocking layer and the optical fiber, the water blocking material comprising a grease having a worked penetration of [85] *300* to 475 as measured according to ASTM-D-712 at room temperature.

3 Claims, 2 Drawing Sheets

WATERPROOF OPTICAL FIBER CABLE

Matter enclosed in heavy brackets [ ] appears in the original patent but forms no part of this reissue specification; matter printed in italics indicates the additions made by reissue.

*This is a Reissue Application for U.S. Pat. No. 4,711,523, issued Dec. 8, 1987, which matured into a patent from Ser. No. 39,806, filed Apr. 15, 1987.*

This application is a continuation, of now abandoned application Ser. No. 637,540, filed Aug. 3, 1984, and now abandoned.

BACKGROUND OF THE INVENTION

1. Field of the Invention

The present invention relates to a waterproof optical fiber cable having incorporated therein a filler, namely a water blocking material, for preventing water from penetrating into the cable from outside.

2. Description of the Prior Art

When the sheath of an optical fiber cable ruptures locally, water naturally ingresses into the cable to impair the light transmission characteristics of the cable.

A system has been proposed for optical fiber cables for early detection of a break in the cable sheath and therefore ingress of water into the cable by monitoring the pressure of a gas filled in the interior of the cable to a high pressure. However, the proposed monitoring system is costly and requires expensive cable systems.

It has also been proposed to provide a water blocking layer beneath the cable sheath and fill the inside space of the layer with a water blocking material in order to directly prevent water from entering the interior of the cable even when a break occurs in the cable sheath, for instance, in IECE-JAPAN-NCR (The Institute of Electronics and Communication Engineers of Japan, National Convention Record) No. 1901 (Page 7-344) 1981, IECE-JAPAN-NCR No. 366 (Page 2-102), No. 1810 (Page 7-252) and No. 1811 (Page 7-253), 1982. The proposal has the advantage of being economical because the above monitoring system is made unnecessary. Water blocking materials known for use in optical fibers are solid or a highly viscous liquid at room temperature. Accordingly such a material is melted by heating before being filled into the cable during the cable making process. The conventional water blocking material has the following drawbacks because the material invariably solidifies or becomes highly viscous while contracting when cooled after filling.

(i) Owing to contraction, a clearance occurs at the interface between the water blocking layer and the water blocking material or at the interface between the water blocking material and the optical fiber in the cable core, with the result that water, if entering the cable, runs through the clearance longitudinally of the cable.

The optical fiber, which is thin, flexible and therefore easily bendable, is restrained by the water blocking material which rapidly becomes viscous or consistent when cooled after filling. Moreover, the contraction of the material causes microbending of the fiber and results in an increased light transmission loss. Especially when the cable is used during winter or in a cold climate, the material undergoes more marked contraction and produces a greater restraint to entail a further increased light transmission loss.

(iii) Because the water blocking material is difficult to remove from the cable after solidification, it is difficult or requires a long period of time to make high precision cable connections.

SUMMARY OF THE INVENTION

The present invention provides an optical fiber cable comprising a water blocking layer, an optical fiber disposed inside the water blocking layer and a water blocking material filling the space between the water blocking layer and the optical fiber, the water blocking material comprising a grease which has a worked penetration of 85 to 475 as measured according to ASTM D-217 at room temperature.

DETAILED DESCRIPTION OF THE INVENTION

Figure 1:
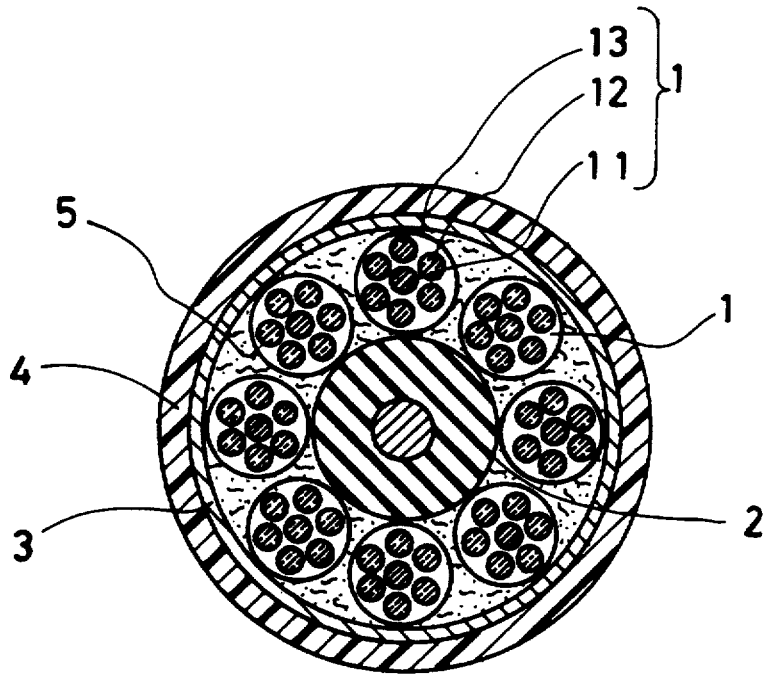
FIGS. 1, 2, 3 and 4 are sectional views showing embodiments of the present invention.

It is generally well known that the grease is defined as a colloidal or micellar dispersion of solid thickener in a natural or synthetic organic liquid. The greases constituting water blocking materials useful for the present invention are those defined as above and having suitable softness, i.e. a worked penetration of 85 to 475 as measured according to ASTM D-217 at room temperature, excluding those which are too soft or solid.

Unlike many mixtures, greases are a dispersion of thickener in an organic liquid and have a special structure as stated above, so that the penetration or consistency thereof has a very low temperature dependence. The greases to be used in this invention retain satisfactory softness without solidification at room temperature and even at considerably low temperatures of below 0° C. and therefore have the following advantages.

(i) Many of the greases can be filled into cables at room temperature without the necessity of heating, whereas they have relatively low flowability in the cable. Certain kinds of water blocking materials incorporated in optical fiber cables according to the invention substantially do not flow down even if the cable is installed in an inclined or vertical position.

(ii) With some of the greases which are difficult to fill at room temperature, or in order to achieve an improved filling efficiency, it is advantageous to suitably heat the grease before use. Nevertheless, the grease still retains satisfactory softness when thereafter cooled to room temperature or even when cooled to a low temperature of below 0° C. Thus, the grease is unlikely to restrain the optical fiber, rendering the fiber free of microbending during use.

(iii) The present greases do not solidify over a wide range of temperatures including room temperature, making cable connections easy.

The greases to be used in the present invention are a colloidal or micellar dispersion of solid thickener in a natural or synthetic organic liquid and have a worked penetration of 85 to 475 as measured according to ASTM D-217 at room temperature. Examples of useful natural organic liquids are mineral oils such as transformer oil, spindle oil, cable insulatin oil, machine oil, vegetable oils such as rosin oil, castor oil, olive oil and arachis oil and the like. Examples of useful synthetic organic liquid are hydrocarbons such as α-olefin oligomers, polybutene, esters such as di-octyl sebacate, di-octyl adipate and other esters which are used as plasticizers for polyvinyl chloride, glycols such as polyethylene glycol, polypropylene glycol, and other organic liquids such as silicon oils. Of these, liquids suitable for use have a viscosity at 40° C. of 4 to 10,000 c.st., preferably 6 to 5,000 c.st., more preferably 10 to 1,000 c.st. and a pour point of up to 0° C.

Useful thickeners include, for example, metallic soaps such as higher fatty acid salts of Ba, Sr, Zn, Pb, Cd, K, Na, Ca, Li, Al and like metals; non-soaps such as bentonite, silica gel and phthlocyanine; polyurea compounds such as those having 2 to 20 urea bonds and a molecular weight of 100 to 5,000; amino acid-type oil gelling agents such as N-lauroyl-L-glutamic acid-α, β-di-n-butyramide; cellulose derivatives such as quaternary ammonium salt of cellulose and fatty acid esters of dextrin; etc.

When the thickener is used in an excessive amount, the worked penetration of the grease becomes more dependent on temperature, permitting the grease to exhibit a decreased worked penetration at lower temperatures. On the other hand, if the amount of the thickener is too small, the grease becomes flowable within the cable even at low temperatures, giving rise to the problems to be described later.

The thickener is used in an amount of 1 to 50 parts by weight, preferably 2 to 40 parts by weight, more preferably 3 to 15 parts by weight, per 100 parts by weight of the natural or synthetic liquid.

Examples of suitable greases are greases of metallic soap type such as sodium soap grease, calcium soap grease, aluminum soap grease, lithium soap grease, calcium complex soap grease, aluminum complex soap grease, greases of the non-soap type such as bentonite grease, silica gel grease, polyurea grease, etc. Other useful greases are disclosed by Hiroshi Horiguchi in Lubricants and Greases (pages 402–419, Sankyoshuppan Co., Ltd., Tokyo, February 1970).

Greases less than 85 in worked penetration are hard and therefore need to be softened by heating before filling. Such greases tend to solidify at low temperatures. On the other hand, greases greater than 475 in worked penetration have excessive flowability so that when contained in a cable installed in a inclined or vertical position, the grease will flow down the interior of the cable, possibly producing a head inside a lower cable portion that could cause a break in the sheath or creating a space within an upper cable portion. Accordingly it is preferable to use greases having a worked penetration of 100 to 450, more preferably 150 to 450, most preferably 200 to 400 at room temperature. More preferred greases are those having a worked penetration of 100 to 450, especially 120 to 385, at roomtemperature, especially at 25° C. and at least 85, especially at least 100, at −30° C.

The water blocking material to be used in the present invention may consist singly of such a grease but can be a mixture of a grease and other chemicals such as an anti-oxidant, pigment, water absorbing agent, etc. However, the amounts of chemicals other than the grease need to be limited to such ranges that will not impair the foregoing characteristics of the grease.

When a grease containing a water absorbing agent is used as the water blocking material, water, if entering the cable, is absorbed by this agent to prevent the water from flowing through the cable longitudinally.

While the water absorbing agent can be silica gel, quick lime or like inorganic material having a good ability to absorb water, the agent is preferably a material having a high capacity to absorb at least an amount of water which is equivalent to its own weight. Examples of such highly absorbent agents are organic agents including starch modified with acrylic acid and like graft polymer of starch, graft polymer of cellulose, carboxymethylcellulose, acrylic acid polymer etc.

These organic water absorbing agents have the advantage that even if admixed with the grease in a large amount, the agent will not noticeably impair the foregoing characteristics of the grease. Moreover, use of a large amount of the agent prevents migration of water very effectively. The organic water absorbing agent is used in an amount of 10 to 400 parts by weight, preferably 20 to 300 parts by weight, per 100 parts by weight of the grease.

The mixture of grease and water absorbing agent need not fill the entire space inside the water blocking layer of the optical fiber cable but may be applied to a portion which is likely to be exposed to water penetrating into the cable. For example, the mixture is provided in the form of a thin layer beneath the water blocking layer or immediately above the optical fiber, and the remaining space is filled only with the grease.

Referring to FIGS. 1 to 4 wherein like reference mumerals designate similar parts throughout, there is shown optical fiber cores 1 each comprising a single optical fiber or a strand of a multiplicity of optical fibers, a tension member 2, a water blocking layer 3 formed by enclosing an assembly of cores 1 with a water blocking tape with a longitudinal lap or by winding a water blocking tape around the assembly, a sheath 4, and water blocking material 5 filling the space inside the water blocking layer 3.

The water blocking tape can be a tape made of a metal, such as copper, aluminum, lead or the like, or an organic high polymer having high water blocking ability, such as polyvinylidene chloride, polychlorotrifluoroethylene, biaxially oriented polypropylene or the like. It is desirable that the water blocking tape be at least single-faced with an adhesive layer to adhere the tape to itself at the lap and more preferably be double-faced with an adhesive layer to adhere the water blocking layer 3 to the sheath 4. The sheath 4 itself may be of water blocking structure or may be made of a water blocking material so as to be serviceable also as a water blocking layer in place of the water blocking layer 3.

The tension member 2, which is not always needed, is preferably used because optical fibers generally have low mechanical strength. As shown in FIGS. 1 to 4, tension members 2 of various structures and materials are usable.

With reference to FIG. 1, the optical fiber core 1 comprises an assembly of six optical fibers 12 arranged around a tension member 11 in the form of a string of organic polymer fiber, such as Kevlar®. A holding tape 13 is wound around the assembly. An electrically insulated cable is used as the tension member 2, around which eight optical fiber cores 1 are arranged.

Figure 2:
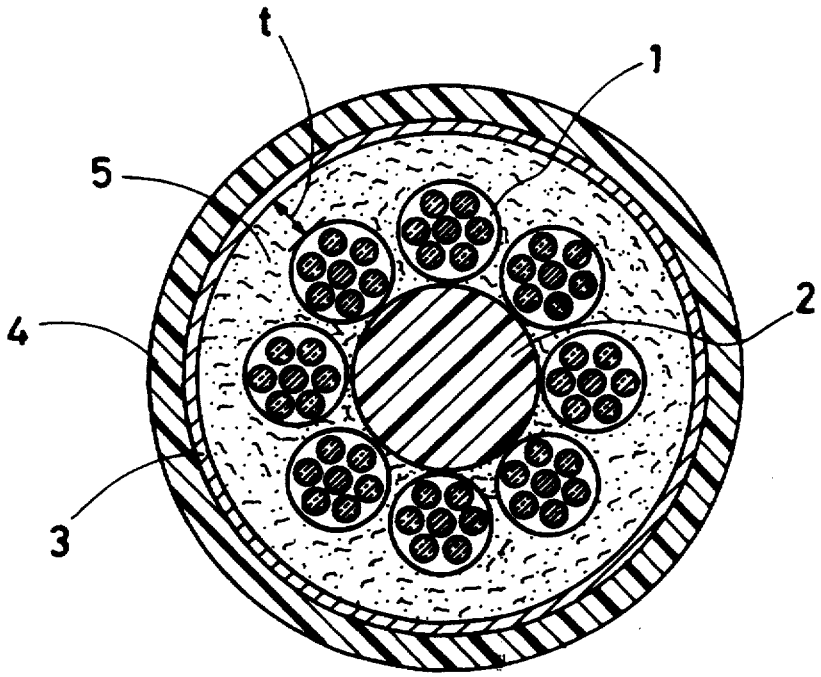

With reference to FIG. 2, a rod of organic polymer reinforced with a fiber such as glass fiber, carbonfiber Kevlar®, is used as the tension member 2, around which eight optical fiber cores 1 are arranged. The water blocking layer 3 is provided at a distance t from the surface of the optical fiber core 1. Although not always necessary, the difance or spacing t, if provided, enables the water blocking material present in the space to serve as a cushion, which will protect the fiber cores 1 from some impact or external force that could act on the cable. The distance t (the shortest distance between the inner surface of the water blocking layer 3 and the optical fiber cores 1) is preferably at least 1 mm, more preferably 2 mm to ½ of the largest outside diameter of the core assembly.

Figure 3:
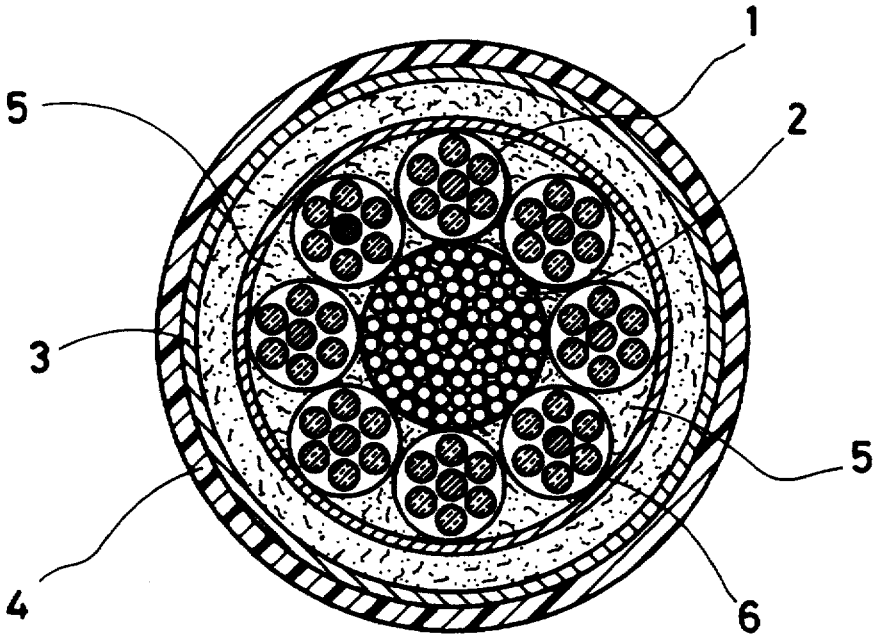

With reference to FIG. 3, eight optical fiber cores 1 are arranged around the tension member 2 comprising a strand of organic polymer strings or metal wires. A holding tape 6 is wound around the assembly of the cores 1 to fasten the cores 1 to the tension member 2. As in the cable of FIG. 2, the water blocking layer 3 is provided at a distance t from the core assembly.

Because the water blocking material filling the interior of the cable of the invention is soft as already described, the optical fiber cores 1 will be displaced from one another or are even likely to cross one another by handling and bending during cable making and installation, resulting in an increased light transmission loss. The optical fiber cores can be positioned in order with one another by winding the cores around the tension member arranged with a large pitch. To avoid the above objection more effectively, it is desirable to wind the holding tape 6 around the optical fiber cores thus assembled as seen in FIG. 3 to fasten the cores 1 to the tension member 2. For the same purpose as above, the holding tape 13 is wound around the assembly of optical fibers 12 in FIG. 1.

To permit the water blocking material 5 to fill the interior space of the cable effectively, the holding tapes 13 and 6 are preferably porous tapes, such as those of woven fabric of natural or synthetic fiber or perforated nonwoven fabric of like material. When an impermeable film tape is used as the holding tape, it is preferable to apply the tape by gap winding. The holding tape 13 or 6, when having a small width, will locally exert a pressure on the optical fibers 12 or optical fiber cores 1 to cause microbending of the fibers or cores. It is therefore desirable that the tapes have a width approximate to 2 to 5 times the outside diameter of the optical fiber 12 or the core 1 for which it is used.

Figure 4:
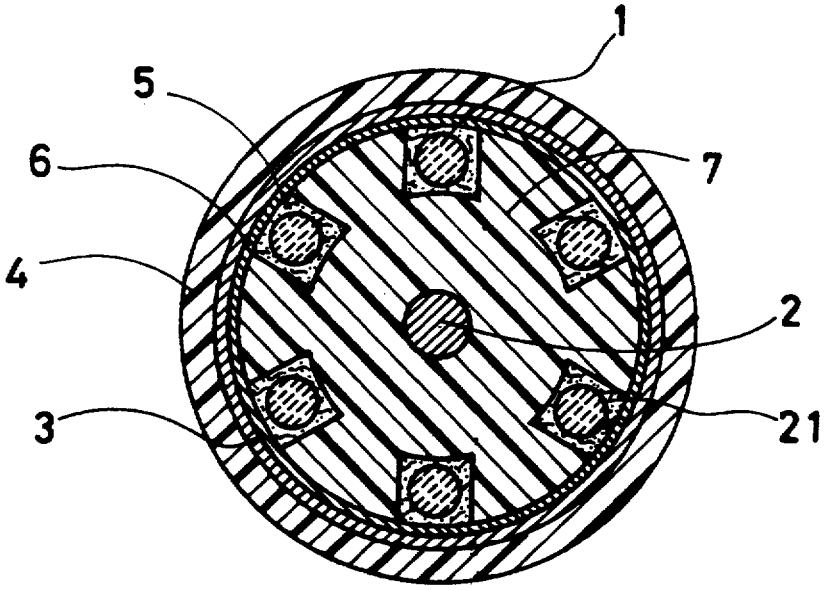

With reference to FIG. 4, the tension member 2 consisting of a wire strand is provided thereon with a spacer 7 made of an organic polymer, such as polyethylene, polypropylene, nylon and the like. The spacer 7 has in its outer periphery a plurality of helical grooves 21 which are slightly larger in width and depth than the outside diameter of the optical fiber core 1. The core 1 is accommodated in each groove 21 as embedded in the water blocking material 5 filling the groove. A holding tape 6 of the foregoing structure is wound around the spacer 7 in the same manner as above. With the optical fiber cable of this construction, each optical fiber core 1 is protected at three sides thereof by the wall of the spacer 7 defining its groove 21 and is restained at the outer side by the holding tape 6, while being enclosed in the water blocking material. Accordingly the optical fiber 1 is fully protected from external forces.

TABLE 1

| | Water Blocking Material (pars by weight) | | | | | | | | | | | | | | |
|---|---|---|---|---|---|---|---|---|---|---|---|---|---|---|---|
| Ingredients | WB1 | WB2 | WB3 | WB4 | WB5 | WB6 | WB7 | WB8 | WB9 | WB10 | WB11 | WB12 | WB13 | WB14 | WB15 |
| Witco compound #5B | 100 | — | — | — | — | — | — | — | — | — | — | — | — | — | — |
| polyurea grease | — | 100 | — | — | — | — | — | — | — | — | — | 100 | 100 | — | — |
| polyurea grease | — | — | 100 | — | — | — | — | — | — | — | — | — | — | — | — |
| polyurea grease | — | — | — | 100 | — | — | — | — | — | — | — | — | — | — | — |
| calsium soap grease | — | — | — | — | 100 | — | — | — | — | — | — | — | — | — | — |
| aluminum soap grease | — | — | — | — | — | 100 | — | — | — | — | — | — | — | — | — |
| lithium soap grease | — | — | — | — | — | — | 100 | — | — | — | — | — | — | 100 | 100 |
| lithium soap grease | — | — | — | — | — | — | — | 100 | — | — | — | — | — | — | — |
| aluminum complex soap grease | — | — | — | — | — | — | — | — | 100 | — | — | — | — | — | — |
| calsium complex soap grease | — | — | — | — | — | — | — | — | — | 100 | — | — | — | — | — |
| bentonite grease | — | — | — | — | — | — | — | — | — | — | 100 | — | — | — | — |
| starch modified with acrylic acid | — | — | — | — | — | — | — | — | — | — | — | 100 | 40 | — | — |
| polysodium acrylate | — | — | — | — | — | — | — | — | — | — | — | — | — | 50 | — |
| Na-carboxymethyl cellulose | — | — | — | — | — | — | — | — | — | — | — | — | — | — | 50 |
| Worked at 25° C. | Solid | 320 | 290 | 210 | 320 | 300 | 280 | 300 | 280 | 300 | 260 | 300 | 320 | 270 | 270 |
| Penetration at −30° C. | Solid | 170 | 145 | 105 | 160 | 150 | 130 | 160 | 140 | 160 | 120 | 140 | 160 | 135 | 135 |

EXAMPLES 1-14, COMPARATIVE EXAMPLE 1

Table 1 shows the compositions of various water blocking materials and the worked penetration values of the materials at 25° C. and −30° C.

Six optical fibers, each comprising a G1-type optical fiber element having a core diameter of 50 μm and a cladding diameter of 125 μm and covered with a nylon jacket, were stranded around a tension member of piano wire. A perforated tape of vinylon fiber nonwoven fabric (tape width: 10 mm) was applied over the strand by winding around the assembly with a ⅓ lap to prepare an optical fiber core 1. Eight of such optical fiber cores 1 were stranded around a tension member consisting of steel wire strand. An aluminum laminate tape was wrapped around the resulting assembly with a longitudinal lap to form a water blocking layer, which was then covered with a polyethylene sheath. Thus, an optical fiber cable of the structure shown in FIG. 1 was prepared which had an outside diameter or 23 mm. While applying the aluminum laminate tape, the water blocking material shown in Table 1 was filled into the inside space. The water blocking materials WB-2 to WB-15 usable according to the invention all have such a worked penetration that they can be filled into cables at room temperature. However, in order to substantiate that the materials can be filled at a higher temperature and then cooled without adversely affecting the transmission loss characteristics of optical fibers, some of the materials were filled at a high temperature. Unlike these, WB-1 used in Comparative Example 1 is solid at room temperature and was therefore heated to 105° C. and filled in a molten state.

Table 2 shows the water blocking materials used in Examples and Comparative Example, the temperatures of the materials to be filled and the characteristics of cables measured by the following methods.

Loss-wave length characteristics

A test sample 500 m in length and wound on a drum was maintained at 25° C., and the loss was measured at 0.85 μm and 1.30 μm by the CUT BACK method.

Loss-temperature characteristics

The same sample was tested for loss characteristics at temperatures of 60° C. and −30° C. at 0.85 μm by the CUT BACK method.

Water blocking effect

The sheath and the water blocking layer were removed over a length of 25 mm form a 2 m long cable test piece approximately at its midportion. A vertical polyethylene pipe filled with water to a height of 1000 mm was connected to the exposed core assembly portion. After allowing the test piece to stand for 14 days, the test piece was checked for distance of water penetration, from the midportion.

TABLE 2

| Comparative Example or Example | Water Blocking Material | Temperature of Filling (°C.) | Characteristics of Optical Fiber Cable: Loss-wave length at 25° C. at 0.85 μm (dB/km) | Loss-wave length at 25° C. at 1.30 μm (dB/km) | Loss-temperature at 0.85 μm at 60° C. (dB/km) | Loss-temperature at 0.85 μm at −30° C. (dB/km) | Running Water blocking effect (distance of water penetration, mm) |
|---|---|---|---|---|---|---|---|
| Co. Ex. | WB1 | 105 | 3.5 | 1.0 | 4.3 | 10.5 | note 1 |
| Ex. 1 | WB2 | room temp | 2.3 | 0.56 | 2.3 | 2.8 | less than 100 |
| Ex. 2 | WB3 | " | 2.5 | 0.56 | 2.7 | 2.9 | " |
| Ex. 3 | WB4 | 60 | 2.3 | 0.55 | 2.3 | 2.3 | " |
| Ex. 4 | WB5 | room temp | 2.4 | 0.59 | 2.4 | 2.6 | " |
| Ex. 5 | WB6 | " | 2.4 | 0.60 | 2.5 | 2.5 | " |
| Ex. 6 | WB7 | " | 2.5 | 0.58 | 2.7 | 2.8 | " |
| Ex. 7 | WB8 | 60 | 2.4 | 0.57 | 2.4 | 2.8 | " |
| Ex. 8 | WB9 | room temp | 2.3 | 0.54 | 2.3 | 2.6 | " |
| Ex. 9 | WB10 | " | 2.6 | 0.70 | 2.7 | 3.0 | " |
| Ex. 10 | WB11 | " | 2.5 | 0.56 | 2.5 | 2.9 | " |
| Ex. 11 | WB12 | " | 2.3 | 0.56 | 2.3 | 2.8 | less than 20 |
| Ex. 12 | WB13 | " | 2.5 | 0.62 | 2.5 | 3.0 | " |
| Ex. 13 | WB14 | " | 2.4 | 0.60 | 2.4 | 2.6 | " |
| Ex. 14 | WB15 | " | 2.4 | 0.58 | 2.4 | 2.4 | " |

note 1
28–30 drops of water leaked from each end of the cable

The cable of Comparative Example 1 has greater loss characteristics than those of Examples apparently owing to the microbending of the optical fibers which resulted from cooling of the filled WB-1 and the consequent contraction. The loss value of the cable in Comparative Example 1 at −30° C. greatly increased from the loss value of 25° C. This is attributable to the fact that the optical fibers, already restrained by WB-1 which was solid at room temperature, further suffered from more marked microbending due to the contraction at −30° C. Further the poor water blocking effect observed with the cable of Comparative Example 1 is apparently due to a water channel produced within the cable by the contraction of WB-1 after filling.

In contrast, the cables of Examples, irrespective of whether the water blocking material was filled at room temperature or as heated at a high temperature, have water blocking properties and exhibit outstanding low-loss characteristics at a low temperature of −30° C. as well as at room temperature. Although the water blocking materials to be used in this invention undergo contraction due to a decrease of temperature, the materials nevertheless do not adversely affect the light transmission loss characteristics of optical fibers presumably because they retain high flexibility even at low temperatures without restraining the optical fibers.

EXAMPLES 15, 16

Twelve of the same nylon-jacketed optical fibers as used in Example 1 were assembled at a pitch of 150 mm, around a tension member of a steel wire strand having a diameter of 2.6 mm. A holding tape consisting of perforated vinylon nonwoven fabric having a thickness of 0.1 mm was wound around the assembly with a ⅓ lap. A water blocking material, WB-9, listed in Table 1 was filled into the space inside the tape layer, an aluminum laminate tape was wrapped around the resulting assembly with a longitudinal lap, and the assembly was further covered with a polyethylene sheath by extrusion. Thus, an optical fiber cable having an outside diameter of 13 mm was prepared (Example 15).

In Example 16, an optical fiber cable was prepared in the same manner as in Example 15 with the exception of using no holding tape.

The cables of Examples 15 and 16 were moved over a length of 1.5 m around a metal wheel, 138 mm in diameter, in frictional rubbing contact with its peripheral surface five times by applying a tensile force of 100 kg. The loss characteristics of the cables of 0.85 μm were determined before and after the above procedure by the abovementioned method. The resulting increment of loss was 0.2 dB in the case of Example 15 and 4.5 dB in the case of Example 16.

What is claimed is:

1. An optical fiber cable comprising a water blocking layer, an optical fiber disposed inside the water blocking layer and a water blocking material filling the space between the water blocking layer and the optical fiber, the water blocking material comprising a grease having a worked penetration of [150] *300* to 450 at room temperature and of at least 85 at −30° C. as measured according to ASTM-D-217, said grease comprising an organic liquid having a viscosity at 40° C. of 6 to 5000° c.st. and 3 to 35 parts by weight per 100 parts by weight of said organic liquid of a thickener.

2. An optical fiber cable as defined in claim 1 wherein the water blocking material further comprises a water absorbing agent in an amount of 10 to 400 parts by weight per 100 parts by weight of the grease.

3. An optical fiber cable as defined in claim 1 wherein the grease is at least one member selected from the group consisting of calcium soap grease, aluminum soap grease, lithium soap grease, calcium complex soap grease, aluminum complex soap grease, bentonite grease, and polyurea grease.

* * * * *